United States Patent [19]

Rowlett

[11] 4,178,596

[45] Dec. 11, 1979

[54] RADAR AUGMENTATION SYSTEM FOR AIRBORNE TARGET

[75] Inventor: Robert P. Rowlett, Thousand Oaks, Calif.

[73] Assignee: Northrop Corporation, Los Angeles, Calif.

[21] Appl. No.: 925,988

[22] Filed: Jul. 19, 1978

[51] Int. Cl.² ............................ G01S 7/38; H01Q 1/28
[52] U.S. Cl. .................................. 343/18 E; 343/705
[58] Field of Search .............................. 343/705, 18 E

[56] References Cited

U.S. PATENT DOCUMENTS

| | | | |
|---|---|---|---|
| 2,503,109 | 4/1950 | Harris | 343/705 |
| 2,598,064 | 5/1952 | Lindenblad | 343/705 X |
| 2,879,999 | 3/1959 | Marshall | 343/18 B X |
| 3,004,153 | 10/1961 | Alford | 343/705 X |
| 3,152,330 | 10/1964 | Chatelain | 343/705 |
| 3,604,006 | 9/1971 | Rogers | 343/705 |
| 3,611,371 | 10/1971 | Morse | 343/112 CA X |
| 3,792,477 | 2/1974 | Tomiyasu | 343/18 E |
| 3,972,045 | 7/1976 | Perret | 343/705 |
| 3,978,410 | 8/1976 | Manoli et al. | 343/705 X |

Primary Examiner—Malcolm F. Hubler
Attorney, Agent, or Firm—William W. Rundle; Willard M. Graham

[57] ABSTRACT

An active radar augmentation system in a drone target aircraft, for the purpose of decreasing damage to the target. The system includes a receiving antenna in the nose, an amplifier, and a rear mounted transmitting antenna, connected by suitable cables.

4 Claims, 2 Drawing Figures

RADAR AUGMENTATION SYSTEM FOR AIRBORNE TARGET

BACKGROUND OF THE INVENTION

1. Field of the Invention

The present invention relates to airborne targets, and more particularly, to radar augmentation in the target for reducing target losses due to missile hits.

Airborne targets are in wide use for evaluation of missile performance and for training of firing crews. Since the objective is to hit the target, more direct hits mean greater target losses. In order to decrease these losses, non-flying targets have been towed behind a piloted or drone aircraft, and inexpensive targets have been launched from a carrier aircraft. Also, targets are built to be recovered and re-used.

In the case of targets for missiles guided by radar, the target may be made a minimum size and construction cost, and be equipped with radar augmentation to produce the desired radar return signal to make the missile guidance system track on the target. A passive radar augmenting means such a Luneberg lens, for example, is commonly used in the nose of a target to reflect an augmented radar return signal to a missile approaching from forward of the target. An active radar augmenting system could be used instead, but its cost would obviously be more than a simple passive system. Still it would be advantageous to reduce the overall target losses even further.

2. Description of the Prior Art

U.S. Pat. No. 2,879,999 (to L. S. Marshall) shows an aerial tow target having a (radar) reflector on the extreme tail end of the fuselage, for the purpose of allowing the target to show up better to fighter aircraft approaching from the stern. U.S. Pat. No. 3,685,050 (to V. F. Cartwright) teaches amplifying and returning the signal from a target, utilizing the same antenna. In neither of these patents is there a teaching of retransmitting the signal forward from only the rear or tail of a target.

While it is possible that more pertinent prior art exists, Applicant's search is believed to have been conducted with a conscientious effort to locate and evaluate the most relevant art available at the time, but this statement is not to be construed as a representation that no more pertinent art exists.

SUMMARY OF THE INVENTION

An object of the present invention is to decrease target losses from missile hits by causing the missile to pass or explode behind the target.

Briefly, my invention comprises an active radar augmentation system in a target wherein the transmitting antenna is located at the rear of the target, and preferably has a wide-angle forward directional pattern. The receiving antenna is preferably located in the forward portion and an amplifier is connected between the two antennas.

DESCRIPTION OF THE DRAWINGS

In the accompanying drawings of a preferred form of the invention.

DESCRIPTION OF THE PREFERRED EMBODIMENT

Figure 1:
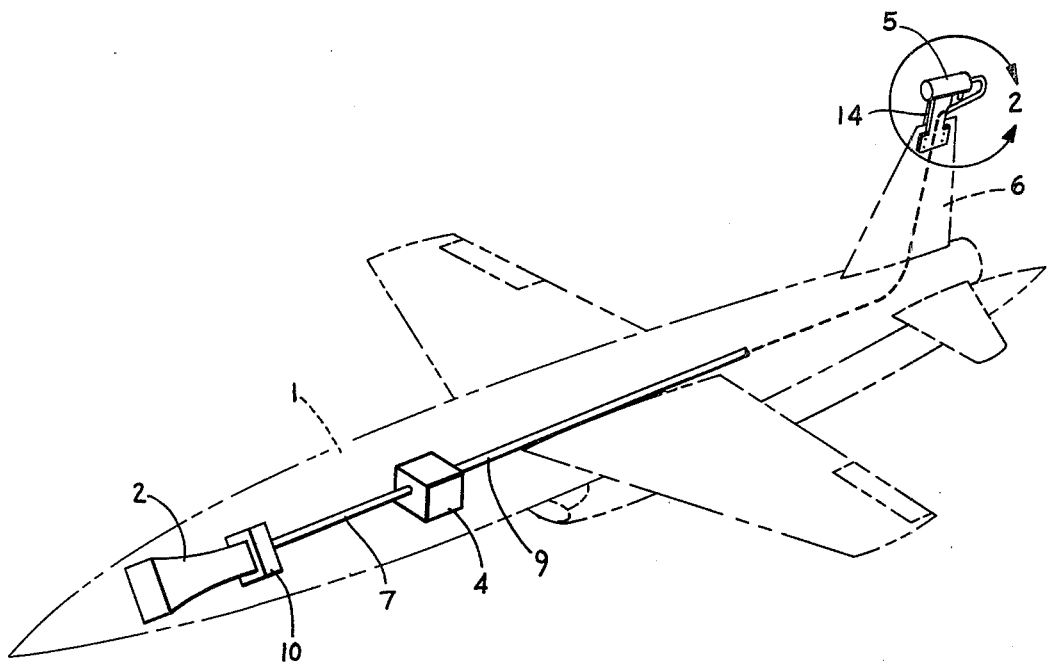
FIG. 1 is a perspective view of an airborne target showing the location of the radar augmentation system components.

FIG. 1 shows a relatively small unmanned jet aircraft 1 used as an aerial target. It carries a parachute (not shown) remotely controlled for deployment and recovery of the craft after a mission is completed. The target aircraft 1 is provided with an active radar augmenter where increased apparent target size is required for various missile systems. The augmenter comprises a receiving antenna 2 in the nose of the fuselage, an amplifier 4, and a transmitting antenna 5 mounted atop a vertical fin 6 at the rear of the aircraft 1, these three units being interconnected as shown by suitable transmission cables 7 and 9.

For a particular surface-to-air missile having X-band semi-active radar guidance, for example, a ground based radar sends signals which are received by the receiving antenna 2. These signals are amplified by amplifier 4 and re-transmitted by transmitting antenna 5 to the missile (not shown). The missile receives the signals from transmitting antenna 5 and tracks on this antenna to guide itself to the target 1 and explode by means of an rf proximity fuze, for example.

The receiving antenna 2 may be a conventional horn type having a directional pattern pointed forward with 30 to 40-degree solid angle coverage in the 8 to 11 GHz frequency range. Antenna 2 preferably has good reception for both horizontally and vertically polarized waves, and for this reason may be axially rotated 45° to 55° from the normal horizontal position, as shown in FIG. 1. The antenna 2 is coupled to the connecting cable 7 by a waveguide adapter 10.

The amplifier 4 is any suitable conventional high-gain unit which faithfully reproduces its input signal in the required operating range.

Figure 2:
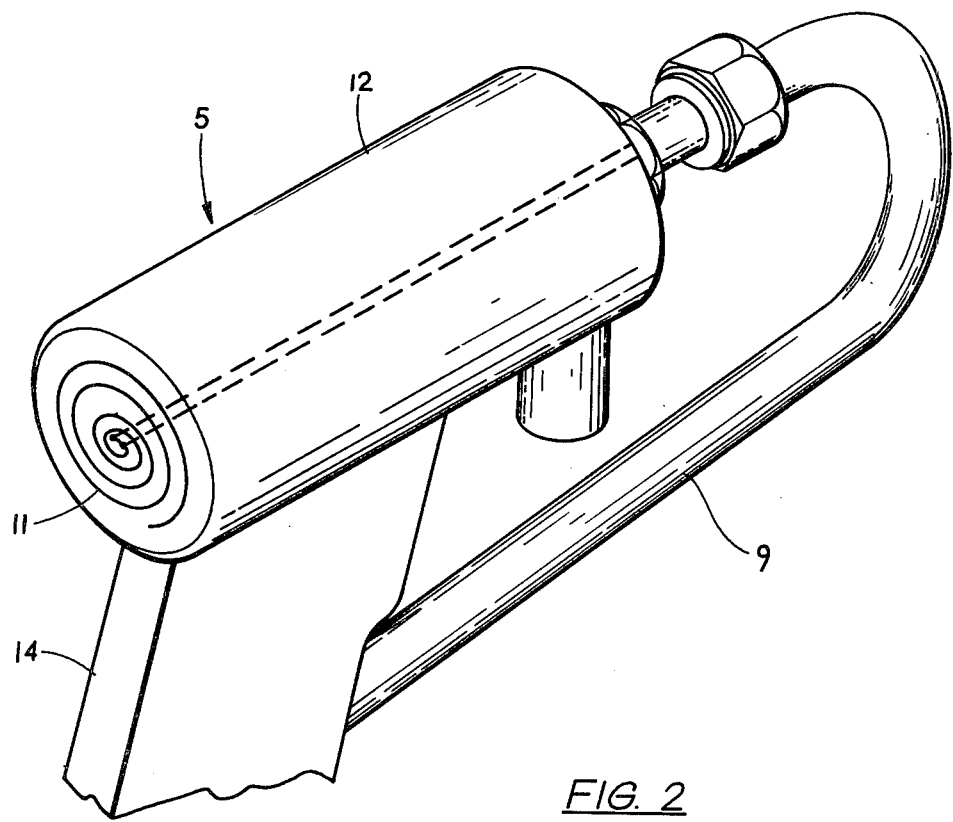
FIG. 2 is an enlarged fragmentary view showing the transmitting antenna on top of the vertical tail, viewed as indicated by the circle with the numeral 2 in FIG. 1.

The transmitting antenna 5, further shown in FIG. 2, may comprise a printed-circuit spiral 11 mounted vertically in the front of a cylindrical cavity 12 which is attached to an extension 14 from the top of the vertical fin 6. The extension 14 may not be necessary if the forward portion of the aircraft does not block the desired transmitting pattern of transmitting antenna 5. Transmitting antenna 5 should be able to transmit both horizontally and vertically polarized waves, so that good performance will be possible in all applications of the invention. The directional pattern is wide, preferably from about 120 degrees up to 10 degrees down, in pitch, and about ±60 degrees in yaw.

In former operations of this type, a missile was guided by a signal reflected to it from an augmenter in the target nose, such as a Luneberg lens. With the present invention, the missile is guided by a signal transmitted to it from the rear area of the target. The signal is strong enough so that the missile guidance ignores other radar returns, even from the skin surface of the target 1.

It is thus seen that direct hits on the target will be fewer and that near misses will be farther behind the target. More targets can be recovered and repaired for repeated flights while still allowing missile scoring systems to be effectively used, in conjunction with proximity fuzing of the missiles. In actual practice, there has been a significant worthwhile reduction of target destruction.

The present invention can also be used with missiles other than surface-to-air missiles, such as air-to-air for example. The direction and coverage angle of either antenna can obviously be changed to suit any missile system. By having an active augmenting system like the present one, the "reflected" signal can be directed where desired by choice of directional pattern of the rear-mounted transmitting antenna 5. For missiles approaching the target from directions other than forward, the transmitting antenna can be mounted on the rear of the target fuselage, for example.

The present receiving antenna 2 is not required to be installed in the aircraft nose, but it obviously should be far enough from transmitting antenna 5 so the two will not interfere.

While in order to comply with the statute, the invention has been described in language more or less specific as to structural features, it is to be understood that the invention is not limited to the specific features shown, but that the means and construction herein disclosed comprise the preferred mode of putting the invention into effect, and the invention is therefore claimed in any of its forms or modifications within the legitimate and valid scope of the appended claims.

What is claimed is:

1. An active radar augmentation system for reducing aerial target losses from hits of radar guided missiles, comprising:
    a. a receiving antenna in the forward portion of the target for receiving radar signals from an attacking missile system;
    b. an amplifier connected to said receiving antenna; and
    c. a transmitting antenna connected to the output of said amplifier for transmitting said radar signals as a return to the missile, said transmitting antenna mounted in a rearward location on said target in position to transmit over a wide unimpeded zone, whereby the radar guided missiles are guided by return signals from the rear area of said target and thus tend to pass behind said target.

2. Apparatus in accordance with claim 1 wherein said receiving and transmitting antennas are each of a type having good operation with both horizontally and vertically polarized electromagnetic waves.

3. Apparatus in accordance with claim 1 wherein said transmitting antenna comprises a spiral type antenna positioned in a normally vertical plane.

4. Apparatus in accordance with claim 1 wherein the return signal transmitted from said transmitting antenna is stronger than reflected radar returns from all other target structure.

* * * * *